US012606683B2

(12) United States Patent
Bellin et al.

(10) Patent No.: US 12,606,683 B2
(45) Date of Patent: Apr. 21, 2026

(54) EXPANDABLE STYRENE POLYMERS COMPRISING POLYMERIC BROMINATED FLAME-RETARDANT

(71) Applicant: BASF SE, Ludwigshafen am Rhein (DE)

(72) Inventors: Ingo Bellin, Ludwigshafen am Rhein (DE); Eckhard Neufeld, Ludwigshafen am Rhein (DE); Jan Holoch, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 797 days.

(21) Appl. No.: 17/918,584

(22) PCT Filed: Apr. 19, 2021

(86) PCT No.: PCT/EP2021/060016
§ 371 (c)(1),
(2) Date: Oct. 13, 2022

(87) PCT Pub. No.: WO2021/213950
PCT Pub. Date: Oct. 28, 2021

(65) Prior Publication Data
US 2023/0146413 A1    May 11, 2023

(30) Foreign Application Priority Data
Apr. 21, 2020    (EP) ..................................... 20170494

(51) Int. Cl.
| | |
|---|---|
| *C08J 9/00* | (2006.01) |
| *C08F 293/00* | (2006.01) |
| *C08L 25/06* | (2006.01) |

(52) U.S. Cl.
CPC ........... *C08J 9/0066* (2013.01); *C08F 293/00* (2013.01); *C08J 9/0061* (2013.01); *C08L 25/06* (2013.01); *C08J 2205/044* (2013.01); *C08J 2325/06* (2013.01); *C08J 2453/02* (2013.01)

(58) Field of Classification Search
CPC .. C08J 9/0066; C08J 9/0061; C08J 2205/044; C08J 2325/06; C08J 2453/02; C08F 293/00; C08F 8/20; C08F 12/08; C08F 287/00; C08F 212/08; C08F 2/44; C08L 25/06; C08L 53/025; C08K 3/04
See application file for complete search history.

(56) References Cited

U.S. PATENT DOCUMENTS

| | | | |
|---|---|---|---|
| 2008/0287559 A1* | 11/2008 | King | ........................... C08J 9/16 525/359.2 |
| 2012/0252914 A1* | 10/2012 | Hahn | ...................... C08L 25/04 264/141 |
| 2012/0253914 A1 | 10/2012 | Black | |

FOREIGN PATENT DOCUMENTS

| | | |
|---|---|---|
| CN | 102656220 A | 9/2012 |
| WO | 2007/058736 A1 | 5/2007 |
| WO | 2015/065393 A1 | 5/2015 |
| WO | 2018/210961 A1 | 11/2018 |
| WO | 2018/210965 A1 | 11/2018 |

OTHER PUBLICATIONS

International Search Report and Written Opinion received for PCT Patent Application No. PCT/EP2021/060016, mailed on Jun. 16, 2021, 9 pages.

* cited by examiner

*Primary Examiner* — K. Boyle
(74) *Attorney, Agent, or Firm* — Faegre Drinker Biddle & Reath LLP

(57)    ABSTRACT

Expandable styrene polymers comprising polymeric brominated flame-retardant, wherein the polymeric brominated flame-retardant comprises at least one brominated polybutadiene block having a bromination degree between 33 and 75%, based on the double bonds in the polybutadiene block before bromination, a process for producing such expandable styrene polymers by suspension polymerization and particulate foam moldings made therefrom.

14 Claims, No Drawings

EXPANDABLE STYRENE POLYMERS COMPRISING POLYMERIC BROMINATED FLAME-RETARDANT

CROSS-REFERENCE TO RELATED APPLICATIONS

This application is a national stage application (under 35 U.S.C. § 371) of PCT/EP2021/060016, filed Apr. 19, 2021, which claims benefit of European Application No. 20170494.7, filed Apr. 21, 2020, both of which are incorporated herein by reference in their entirety.

The present invention relates to expandable styrene polymers comprising polymeric brominated flame-retardants, a process for producing such expandable styrene polymers by suspension polymerization and particulate foam moldings made therefrom.

RELEVANT PRIOR ART

WO 2007/058736 discloses thermally stable brominated styrene/butadiene copolymers and their use as a flame-retardant additive for polymeric compositions, both foamed, and non-foamed, that incorporate a flame-retarding amount of brominated butadiene copolymer as alter-native to hexa-bromocyclododecane (H BCD). This flame retardant, how-ever, shows a strong nucleating effect in suspension-polym-erized expandable polystyrene, which results in polystyrene foams with very small cell sizes and poor insulation prop-erties.

US 2012/0253914 A1 discloses flame retardant expand-able styrene polymers and foams comprising 1 to 10 wt.-% of an infrared absorber and at least one halogenated polymer as flame retardant.

WO 2015/065393 discloses that the inclusion of a small amount of unbrominated vinyl aromatic/butadiene block copolymer improves cell size homogeneity and reduces density in foamed styrene polymers, when the foam is made in a melt extrusion process using brominated styrene-buta-diene block copolymers as flame retardant.

WO 2018/210961 and WO 2018/210965 suggest improv-ing miscibility of the brominated block copolymer with the polystyrene matrix to enlarge cell size in the polystyrene foams. Miscibility is improved by using mixtures of differ-ent brominated block copolymers or by adjusting the molecular weights of the styrene and butadiene blocks before brominating. Dosing or manufacturing process of the brominated block copolymers is effortful.

The present invention was made in view of the prior art described above, and the object of the present invention is to provide flame-retardant expandable styrene polymers, which can be produced by a suspension-polymerization process and which can be converted to foam particles with enlarged cell size and flame-retardant particle foam mold-ings with low thermal conductivity and good insulation properties.

To solve the problem, the present invention provides expandable styrene polymers comprising polymeric bromi-nated flame-retardants, wherein the polymeric brominated flame-retardant comprises at least one brominated polybuta-diene block having a bromination degree between 33 and 75%, based on the double bonds in the polybutadiene block before bromination.

The bromination degree is the percentage of the non-aromatic double bonds in the polybutadiene block, which have been brominated. The bromination degree may be determined by $^1$H-NMR spectroscopy. For this purpose, the ratio of the integrated areas of signals relating to residual double bond protons and signals relating to protons for brominated polybutadiene are determined.

Alternatively, the bromination degree (BrD) can be cal-culated from the total bromine content (Br %), number of non-aromatic double bonds (NDB) or molecular weight of the polymer (MP) before bromination and percentage of butadiene (BD %) according to the following equations:

$$Br\ \% = (BrD*NDB*160)/((BrD*NDB*160)+MP)$$

with $$NDB = (MP*BD\ \%)/54$$

or $$BrD = 3375*Br\ \%/(BD\ \%(100\%-Br\ \%))$$

Preferred embodiments are described in claims 2 to 7.

Preferably, the polymeric brominated flame retardant has a total bromine content in the range from 40 to 60 wt.-%, more preferably in the range from 50 to 55 wt.-%. The total bromine content of the polymeric brominated flame retar-dant may be determined by elemental analysis, i.e through combustion and argentometric analysis.

Suitable polymeric brominated flame-retardants are bro-minated vinylaromatic-diene block copolymers (Br—SBC) comprising at least one vinylaromatic polymer block S, in particular polystyrene block, and at least one brominated diene polymer block BB.

The following can be used as vinylaromatic monomers for the block S: styrene, alpha-methylstyrene, p-methylstyrene, ethylstyrene, tert-butylstyrene, vinyltoluene or a mixture thereof. It is preferable to use styrene.

The following are preferably used as dienes for the block BB: butadiene, isoprene, 2,3-dime-thylbutadiene, 1,3-pen-tadiene or 1,3-hexadiene or a mixture thereof. It is particu-larly preferable to use 1,3-butadiene.

Preferably, the vinylaromatic-diene block copolymers (SBC) comprises before bromination 20 to 50 wt.-% of polymerized vinylaromatic monomer units, in particular styrene monomer units, and from 50 to 80 wt.-% of polym-erized diene units, preferably butadiene units. Most prefer-ably, the vinylaromatic-diene block copolymers (SBC) com-prises before bromination 25 to 45 wt.-% of polymerized vinylaromatic monomer units, in particular styrene mono-mer units, and from 55 to 75 wt.-% of polymerized diene units, preferably butadiene units.

The vinylaromatic-diene block copolymers (SBC) may have a linear or a symmetrical or asymmetrical star-shaped structure. Blends of vinylaromatic-diene block copolymers (SBC) may be used before or after bromination.

Preferably, the polymeric brominated flame retardant is selected from a brominated styrene-butadiene-styrene tri-blockcopolymer.

Preferably, the polymeric brominated flame retardant comprises 50 to 85 wt.-% of brominated polybutadiene blocks.

Preferably, the weight average molecular weight $M_w$ of the polymeric brominated flame-retardant is in the range from 80.000 to 180.000 g/mol, determined before bromina-tion.

The polymeric brominated flame retardant is most pref-erably selected from a brominated sty-rene-butadiene-sty-rene triblock copolymer $S_1$—B—$S_2$ with a total styrene block content of 20 to 50 wt.-%, in particular 25 to 45 wt.-% and a difference in the weight average molecular weight $M_w$ between block $S_1$ and $S_2$ is less than 10.000 g/mol.

The weight average molecular weight $M_w$ is determined prior prior to the bromination by Gel Permeation Chromatography (GPC) according to ISO 16014-3: 2012 relative to polystyrene standards in 25° C. in THF Preferably, the at least one brominated polybutadiene-block has a vinyl content between 50 and 95%, based on the double bonds in the polybutadiene block before bromination. Vinyl content means the relative proportion of 1,2 linkages of the diene units of the Br—SBC block copolymer before bromination, based on the entirety of the 1,2,1,4-cis and 1,4-trans linkages.

Bromination of vinylaromatic-diene block copolymers (SBC) may be carried out as described in WO 2007/058736. It is preferable to produce the brominated butadiene copolymers of the present invention by selective bromination, particularly by selective bromination under mild conditions. The bromination is preferably carried out ionically.

Once a desired degree of bromination has been achieved, in particular when a tribromide is used as brominating agent, for example tetraalkylammonium tribromide or pyridinium tribromide, byproducts such as tetraalkylammonium monobromide or pyridinium hydrobromide can be re-moved from the reaction solution by washing, decanting or filtration.

Control of the bromination degree has the advantage, that a wide variety of polybutadiene block copolymers can be used as precursor for preparing a polymeric brominated flame retardant with sufficient miscibility with the polystyrene matrix and enlarged cell size in polystyrene foams.

A further subject of the present invention is a process for manufacturing the expandable styrene polymers. Preferred processes are described in claims 8-10.

A preferred process for producing expandable styrene polymers includes polymerization of vinylaromatic monomers in aqueous suspension in the presence of a polymeric brominated flame-retardant, wherein the polymeric brominated flame-retardant comprises at least one brominated polybutadiene block having a bromination degree between 33 and 75%, based on the double bonds in the polybutadiene block before bromination.

The following can be used as vinylaromatic monomers for the aqueous suspension polymerisation: styrene, alpha-methylstyrene, p-methylstyrene, ethylstyrene, tert-butylstyrene, vinyltoluene or a mixture thereof. It is preferable to use styrene monomer.

The aqueous suspension polymerisation may be performed using inorganic salts of an acid containing phosphorous serving as a Pickering stabilizer. Preferably, tricalcium phosphate and/or magnesium pyrophosphate are used. The polymerization can also be performed in the presence of further organic suspending agents like hydroxyethylcellulose, polyvinylpyrrolidone or polyvinyl alcohol.

Most preferably the polymerisation is carried out in the presence of 0.5 to 10% by weight of athermanic particles (e.g. carbon black, coke, calcined coke, graphitized coke, natural and/or synthetic graphite or a mixture thereof), preferably graphite, based on the vinylaromatic monomers. These athermanic particles can also be incorporated into inorganic polymers (e.g. geo-polymers), before incorporating them into the polymer matrix.

The amount of polymeric brominated flame retardant is preferably in the range from 0.25 to 5% by weight, based on the vinylaromatic monomers. Most preferably the amount of polymeric brominated flame retardant is in the range from 0.5 to 2% by weight.

Preferably, a synergist for the polymeric brominated is added. This synergist is a component with a half-life time of 1 hour at temperatures between 120 and 270° C. (determined in monochlo-robenzene). Preferably, the synergist is chosen from dicumyl peroxide, di(tert-butylperoxyisopropyl)benzene, 2,5-dimethyl-2,5-di(tert-butylperoxy)hexane, 2,3-di-methyl-2,3-diphenylbutane and mixtures thereof.

During the aqueous suspension polymerisation, the blowing agents are preferably added after a conversion of the vinylaromatic monomer of at least 20%. The blowing agents are chosen from aliphatic or cycloaliphatic hydrocarbons containing from 3 to 6 carbon atoms such as n-pentane, isopentane, cyclopentane and mixtures thereof.

A further subject of the present invention are styrene polymer foam moldings, obtainable by prefoaming and welding of the expandable styrene polymers described above. Preferably the styrene polymer foam moldings have an average cell size is in the range from 120 to 250 μm.

The average cell size may be determined by microscopic measurement. An average is built by counting at least 25 cells in a line of a sliced piece of a foam molding under a through-light mi-croscope at 60-fold magnification and dividing the length of the line by the number of cells.

EXAMPLES

Hereinafter, the present invention is described in more detail and specifically with reference to the Examples, which however are not intended to limit the present invention.

Brominated Styrene-Butadiene-Styrene triblock copolymers Br—SBS

Styrene-Butadiene-Styrene triblock copolymers SBS with 33 wt.-% polymerized styrene units and 67 wt.-% of polymerized butadiene units (thereof 78% wt. 1,2-units and 22 wt.-% 1,4-units) and a total molecular weight $M_w$ of 130.000 g/mol (determined by GPC according to ISO 16014-3: 2012 relative to polystyrene standards in 25° C. in THF prior to the bromination) were brominated according to WO 2007/058736 with different molar ratios of tetraethylammonium tribromide to obtain the brominated SBS block copolymers with the characteristics shown in Table 1.

Total bromine content in the Br—SBS triblock copolymer was determined by combustion and argentometric analysis.

The degree of bromination of the non-aromatic double bonds was determined by $^1$H-NMR spectroscopy by comparing integrated areas of signals due to residual double bond protons and protons for brominated polybutadiene.

The weight-average molar masses $M_w$ were determined by Gel permeation chromatography methods (GPC) according to ISO 16014-3: 2012 on polystyrene-Gel columns from company Polymer Labs of the type Mixed B, with monodisperse polystyrene standards and tetrahydrofu-ran as eluent at room temperature with 20° C.

TABLE 1

| Br-SBS triblock copolymers: | | |
| --- | --- | --- |
| Br-SBS triblock copolymer | Bromine content in Br-SBS [wt.-%] | Degree of bromination |
| FR 59 | 54% | 59% |
| FR 62 | 55% | 62% |
| FR 78 | 61% | 78% |
| FR 96 | 65% | 96% |
| FR 100 | 66% | 100% |

Examples 1 and 2 and Comparative Examples C1-C3

Preparation of Expandable Polystyrene (White EPS)

15 g of benzoyl peroxide (Perkadox L-W75 from Nouryon), 115 g of dicumyl peroxide (Perkadox® BC—FF from Nouryon) and the amount of Br—SBS triblock copolymer indicated in table 2 were dissolved in 22.8 kg of styrene. This organic phase was entered in 17.5 kg of demineralized water in a 55 l stirred vessel. The aqueous phase contained in addition 36 g of magnesium pyrophosphate (prepared from sodium pyrophosphate and magnesium sulfate). The mixture was heated under stirring to 104° C. within 110 minutes and then heated to 134° C. within 255 minutes. 105 minutes after reaching 80° C., 73 g of a 2 wt.-%-solution of emulsifier E30 (Mersolat® H40 from the company Lanxess) were metered in. After further 46 minutes, 1.21 kg of pentane (Exxsol® pentanes 80 from the company ExxonMobil) were metered in. Stirring is then continued for 1 h hour at the final temperature of 134° C. to complete polymerization. The expandable polystyrene obtained is decanted off and dried.

Then the beads were coated with 0.3% (w/w) of a mixture of 60% (w/w) glycerol tristearate (Soft enol® 3168 from the company 101 Oleo) 30% (w/w) glycerol monostearate (Softenol® 3995 from the company 101 Oleo) and 10% (w/w) zinc stearate (Zincum® 5 from Baerlocher).

Examples 3 and 4 and Comparative Examples C4-C6

Preparation of Graphite-Containing Expandable Polystyrene (Grey EPS) 22.4 g dicetylperoxodicarbonate (Perkadox® 24-FL from Nouryon), 11.3 g tert.-butylethylhexanoat (Trigonox® 21S from Nouryon), 100 g of dicumyl peroxide (Perkadox® BC—FF from Nouryon), 825 g graphite (UF 99.5 from Graphit Kropfmuhl) and the amount of Br—SBS triblock copolymer indicated in table 2 were dissolved in 16.5 kg of styrene. This organic phase was entered in 20.8 kg of demineralized water in a 55l stirred vessel. The aqueous phase contained in addition 50 g of magnesium pyrophosphate (prepared from sodium pyrophosphate and magnesium sulfate). The mixture was heated under stirring to 94° C. within 90 minutes and then heated to 135° C. within 254 minutes. 95 minutes after reaching 80° C., 73 g of a 2 wt.-%-solution of emulsifier E30 (Mersolat® H40 from the company Lanxess) were metered in. After further 110 minutes, 1.25 kg of pentane (Exxsol® Pentane 80 from the company ExxonMobil) were metered in. Stirring is then continued for 1 h hour at the final temperature of 135° C. to complete polymerization. The expandable polystyrene obtained is decanted off and dried.

Then the beads were coated with 0.3% (w/w) of a mixture of 60% (w/w) glycerol tristearate (Softenol® 3168 from the company 101 Oleo) 30% (w/w) glycerol monostearate (Softenol® 3995 from the company 101 Oleo) and 10% (w/w) zinc stearate (Zincum® 5 from Baerlocher).

TABLE 2

Amount of Br-SBS triblock copolymer used in Examples 1 to 4 and Comparative Examples C1 to C6

| Example | BR-SBS | Amount [g] |
|---|---|---|
| 1 | FR 59 | 235 g |
| 2 | FR 62 | 235 g |
| C1 | FR 78 | 213 g |
| C2 | FR 96 | 199 g |
| C3 | FR 100 | 195 g |
| 3 | FR 59 | 277 g |
| 4 | FR 62 | 277 g |
| C4 | FR 78 | 251 g |
| C5 | FR 96 | 235 g |
| C6 | FR 100 | 230 g |

The Production of Particle Foam Molding

The blowing agent-containing beads from Examples 1 to 4 and Comparative Examples C1 to C6 were pre-foamed in flowing steam. After 12 h of storage the prefoamed particles were welded in a closed mold with steam to give particle foam moldings having a density of about 15 kg/m³ for white EPS and about 20 kg/m³ for grey EPS. The results are summarized in table 3.

The determination of the fire behavior according to EN 13238 on 20 mm thick samples was carried out after conditioning according to EN 11925-2 with 15 s edge inflammation.

The thermal conductivity of the samples was determined according to EN 12667 with a guarded hot plate apparaturs with 50 mm thick samples at a mean test temperature of 10° C.

The average cell size was determined by microscopic measurement.

Comparative Examples C1 to C3, which comprise Br—SBC block copolymers with a degree of bromination of at least 78% as flame retardant show a lower cell size and higher thermal conductivity compared with Examples 1 and 2. The same effect is demonstrated for foam moldings made from graphite-containing EPS, when comparing Comparative Examples C4 to C6 with Examples 3 and 4.

TABLE 3

Results of the analysis of the particle foam moldings

| Example | Density [kg/m³] | Fire class according to EN 13501-1 | Thermal conductivity [mW/(m*K)] | Average cell size [μm] |
|---|---|---|---|---|
| 1 | 20.1 | E | 34.4 | 192 |
| 2 | 20.2 | E | 34.6 | 150 |
| C1 | 19.6 | E | 36.4 | 105 |
| C2 | 21.2 | E | 36.0 | 84 |
| C3 | 19.7 | E | 36.8 | 88 |
| 3 | 16.9 | E | 30.6 | 157 |
| 4 | 15.5 | E | 30.9 | 149 |
| C4 | 16.1 | E | 31.8 | 108 |
| C5 | 15.0 | E | 32.3 | 108 |
| C6 | 14.6 | E | 32.1 | 110 |

The invention claimed is:

1. An expandable styrene polymer comprising a polymeric brominated flame-retardant, wherein the polymeric brominated flame-retardant comprises 50 to 85 wt.-% of brominated polybutadiene blocks and the weight average molecular weight $M_w$ of the polymeric brominated flame-retardant is in the range from 80.000 to 180.000 g/mol, determined by Gel Permeation Chromatography according to ISO 16014-3:2012 before bromination and the polymeric brominated flame-retardant has a total bromine content in the range from 50 to 55 wt.-%, determined by elemental analysis, and comprises at least one brominated polybutadiene block having a bromination degree, determined by $^1$H-NMR spectroscopy, between 59 and 75%, based on the double bonds in the polybutadiene block before bromination, wherein a styrene polymer foam prepared from the expandable styrene polymer has an average cell size is in the range from 120 to 250 μm and a thermal conductivity of from 30.6 to 34.6 mW/(m*K).

2. The expandable styrene polymer according to claim 1, wherein the polymeric brominated flame retardant has a total bromine content in the range from 54 to 55 wt.-%.

3. The expandable styrene polymer according to claim 1, wherein the polymeric brominated flame retardant is selected from a brominated styrene-butadiene-styrene tri-blockcopolymer.

4. The expandable styrene polymer according to claim 1, wherein the amount of polymeric brominated flame retardant is in the range from 0.25 to 5% by weight.

5. The expandable styrene polymer according to claim 1, wherein the amount of polymeric brominated flame retardant is in the range from 0.5 to 2% by weight.

6. The expandable styrene polymer according to claim 1, wherein the polymeric brominated flame retardant is selected from a brominated styrene-butadiene-styrene tri-block copolymer $S_1$—B—$S_2$ with a total styrene block content of 20 to 50 wt.-% and a difference in the weight average molecular weight $M_w$ between block $S_1$ and $S_2$ is less than 10.000 g/mol, determined by Gel Permeation Chromatography according to ISO 16014-3:2012 before bromination.

7. The expandable styrene polymer according to claim 1, wherein the at least one brominated polybutadiene-block has a 1,2-vinyl content between 50 and 95%, based on the double bonds in the polybutadiene block before bromination.

8. The expandable styrene polymer according to claim 1, wherein a styrene polymer foam prepared from the expandable styrene polymer has an average cell size is in the range from 149 to 192 μm.

9. The expandable styrene polymer according to claim 1, wherein the polymeric brominated flame retardant is selected from a brominated styrene-butadiene-styrene tri-block copolymer $S_1$—B—$S_2$ with a total styrene block content of 25 to 45 wt.-% and a difference in the weight average molecular weight $M_w$ between block $S_1$ and $S_2$ is less than 10.000 g/mol, determined by Gel Permeation Chromatography according to ISO 16014-3:2012 before bromination.

10. A process for producing the expandable styrene polymer according to claim 1 comprising polymerization of vinylaromatic monomers in aqueous suspension in the presence of a polymeric brominated flame-retardant, wherein the polymeric brominated flame-retardant has a total bromine content in the range from 40 to 60 wt.-%, determined by elemental analysis, and comprises at least one brominated polybutadiene block having a bromination degree, determined by $^1$H-NMR spectroscopy, between 59 and 75%, based on the double bonds in the polybutadiene block before bromination.

11. A process according to claim 10, wherein the polymerization is carried out in the presence of 0.5 to 10% by weight of athermanic particles, based on the vinylaromatic monomers.

12. A process according to claim 10, wherein the amount of polymeric brominated flame retardant is in the range from 0.25 to 5% by weight, based on the vinylaromatic monomers.

13. A styrene polymer foam molding, obtained by pre-foaming and welding of the expandable styrene polymer according to claim 1.

14. The styrene polymer foam molding according to claim 13, wherein the average cell size is in the range from 120 to 250 μm, determined by microscopic measurement.

\* \* \* \* \*